United States Patent Office 2,925,309
Patented Feb. 16, 1960

2,925,309

RECORDING VOLTMETERS

Victor James Cox, Brinkworth, and Raymond John Dennis Reeves, Chippenham, England, assignors to E. K. Cole Limited, Southend-on-Sea, England Application January 12, 1956, Serial No. 558,781

6 Claims. (Cl. 346—32)

This invention relates to a recording voltmeter, which may be used in preference to a cathode ray oscillograph, where a permanent record is desired. The device enables the graphic representative of repetitive wave forms of very high repetitive frequencies to be plotted by "stroboscopic" methods. It can be used in a similar manner to a multiple beam oscilloscope, as a number of associated wave forms can be plotted on related or identical time and voltage scales on one piece of recording paper. Repeated plots of wave forms may also be taken under differing circuit conditions in order to assess by direct comparison the effect of modification. The wide bandwidth of the Y axis and the preservation of the D.C. level are particularly useful features which may be provided. By stroboscopic we infer an analogue with the familiar optical method of studying high speed mechanisms by means of a flashing or "strobing" lamp, to slow down the apparent speed of the mechanism. In order to achieve a sharp image the lamp has to be synchronous or almost synchronous with the mechanism, and the duration of the flash has to be very short. Furthermore, the ambient illumination should be low. The features of such devices have a close parallel with some of the features of this invention.

In its simplest form the invention provides a means whereby the instantaneous voltage of an input wave form is plotted as a function of time, that is to say, the independent variable is a time delay which is controlled by the recording paper carriage X co-ordinate and the dependent variable is the input voltage waveform which drives the recording stylus in the Y direction. In a more complex form of the invention, the apparatus provides a means of comparing in graph form two repetitive wave forms of similar frequency, time appearing only as a parameter.

One feature of the invention is a recording voltmeter for a repetitive wave form in which the instantaneous voltage of the wave form is compared with a reference voltage to be found on the slider of a first potentiometer at isolated short intervals of time, controlled by a gating pulse and wherein any difference is used to operate servo means to move the slider and thus to feed back a change of reference voltage to correct that difference, in which the device determining the magnitude of the reference voltage is caused simultaneously to operate a recording stylus and in which the gating pulse is of the same frequency as that of the repetitive wave form or a submultiple of that frequency, and means for introducing a slight asynchronism into the gating pulse repetitive frequency with respect to the repetition frequency of the wave form.

By asynchronism we mean a controlled phase shift of the gated pulse with respect to the phase of the fundamental component of the input wave form, and means of introducing the asynchronism is achieved by a second potentiometer mechanically coupled to the X movement of the paper carriage, the voltage on the slider of this potentiometer controlling the phase of the gate pulse with respect to the waveform or a synchronous waveform separately acquired for that purpose, through the medium of a time delay circuit.

Another feature of the invention is a modification of the above in which instead of the slider of the second potentiometer controlling the asynchronism it defines a second reference voltage, and it is operated by an error signal derived from a second repetitive wave form, of the same repetitive frequency as the first, and the second reference voltage, the slight asynchronism in this case being derived from an arbitrarily controlled time delay device.

The gating pulse will usually be a very small fraction of a micro-second in duration.

The above and other features of the invention will be more readily understood by a perusal of the following description having reference to the accompanying drawings in which.

Figure 1:
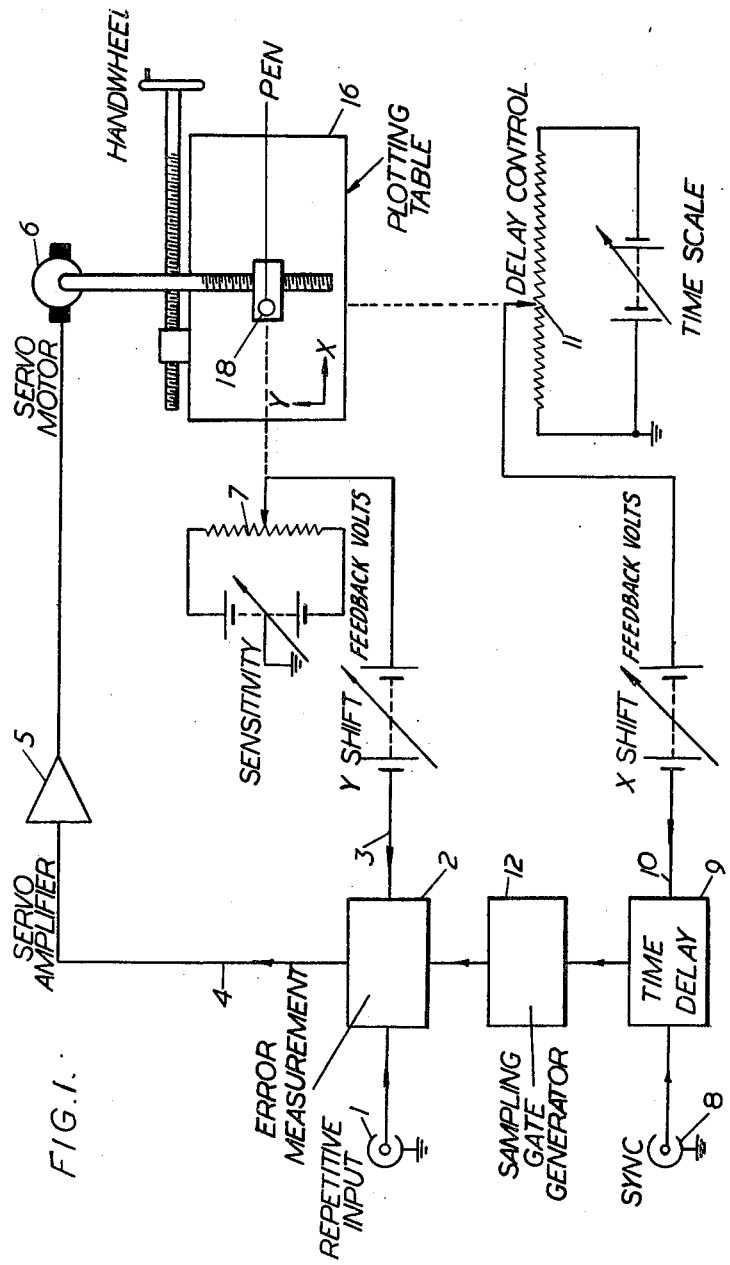
Figure 1 is a schematic circuit diagram of one form of the invention.

In Figure 1, 1 is an input terminal for a repetitive waveform under observation. This is fed to a gated voltage difference indicating device 2 where it is compared with the voltage fed from a lead 3. Any voltage difference arising from this comparison appears in a lead 4, is amplified by an amplifier 5 and operates a servo motor 6. The slider of a potentiometer 7 is operated by the motor. A recording stylus 18 is mechanically coupled with the slider. The slider comes to rest when the voltage on lead 3 has balanced out the voltage difference in the device 2. Thus, if the potentiometer law is linear, the stylus position, recorded on the graph, is linearly related to the voltage of the waveform from terminal 1 at the instant of comparison. Terminal 8 is connected to a synchronizing waveform which is synchronous with the repetitive frequency of the waveform at terminal 1, and this wave is fed to a delay device 9 whose delay time is controlled over a lead 10 from a potentiometer 11 whose slider is mechanically coupled with the recording sheet carrier 16 so that the delay volts in lead 10 depend on the paper position. The output from the delay device 9 is to a gate pulse generator 12. This acts as a trigger device to determine the time intervals during which the device 2 is operative. Thus the apparatus acts as a sampling device sampling the instantaneous voltage of the input waveform.

Figure 2:
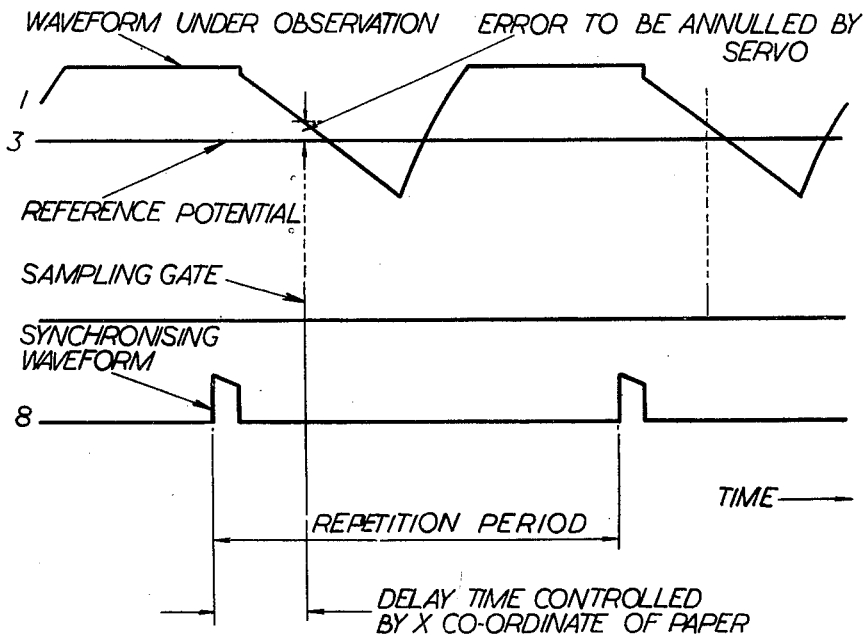
Figure 2 shows the relationship between typical waveforms in Figure 1.

Figure 2 shows the relationship between typical waveforms in Figure 1, waveform 1 being an example of a repetitive waveform under observation being applied to terminal 1 of Figure 1, waveform 3 being the reference potential on lead 3 of Figure 1 (at all times proportional to the Y co-ordinate of the stylus), and waveform 8 applied to terminal 8 of Figure 1 being some waveform synchronous with 1 which can be used to initiate the time delay period.

At the instant defined by the very brief sampling gate the difference between 1 and 3 is measured, and this measure is used to drive the servo motor to change the reference potential until the error is annulled. In this way, the reference potential is constrained to be determined by the input waveform 1 and the time delay between the sync signal and the sampling gates. But this time delay is governed by the X co-ordinate of the table, through the voltage on the slider of potentiometer 11 (Figure 1) so that movement of the sampling gates is governed by, and linearly related to, movement of the table.

By identifying the paper speed with the drift rate of the gate, the relation between voltage and time displacement is plotted, and on a time scale which could not possibly be achieved by ordinary mechanical methods. For instance, it is possible to achieve an effective scale on the paper of 0.1 u-seconds per inch, which is about a million times faster than rates of writing with a conventional recording voltmeter. Many obvious advantages accrue from using paper as a recording medium rather than a cathode ray tube. Significant potential cursors can be superposed and any number of wave forms can be added to the same record with true or arbitrary voltage relation to each other. Also the inherently slow rate of plotting ensures an adequate number of sampling time intervals to draw all the significant details of the waveform.

The feedback nature of the instrument simplifies the design of the error circuit and servo amplifier, and ensures an accurate voltage scale on the recording paper. It also enables the D.C. level of the waveform to be preserved in the recording.

Figure 3:
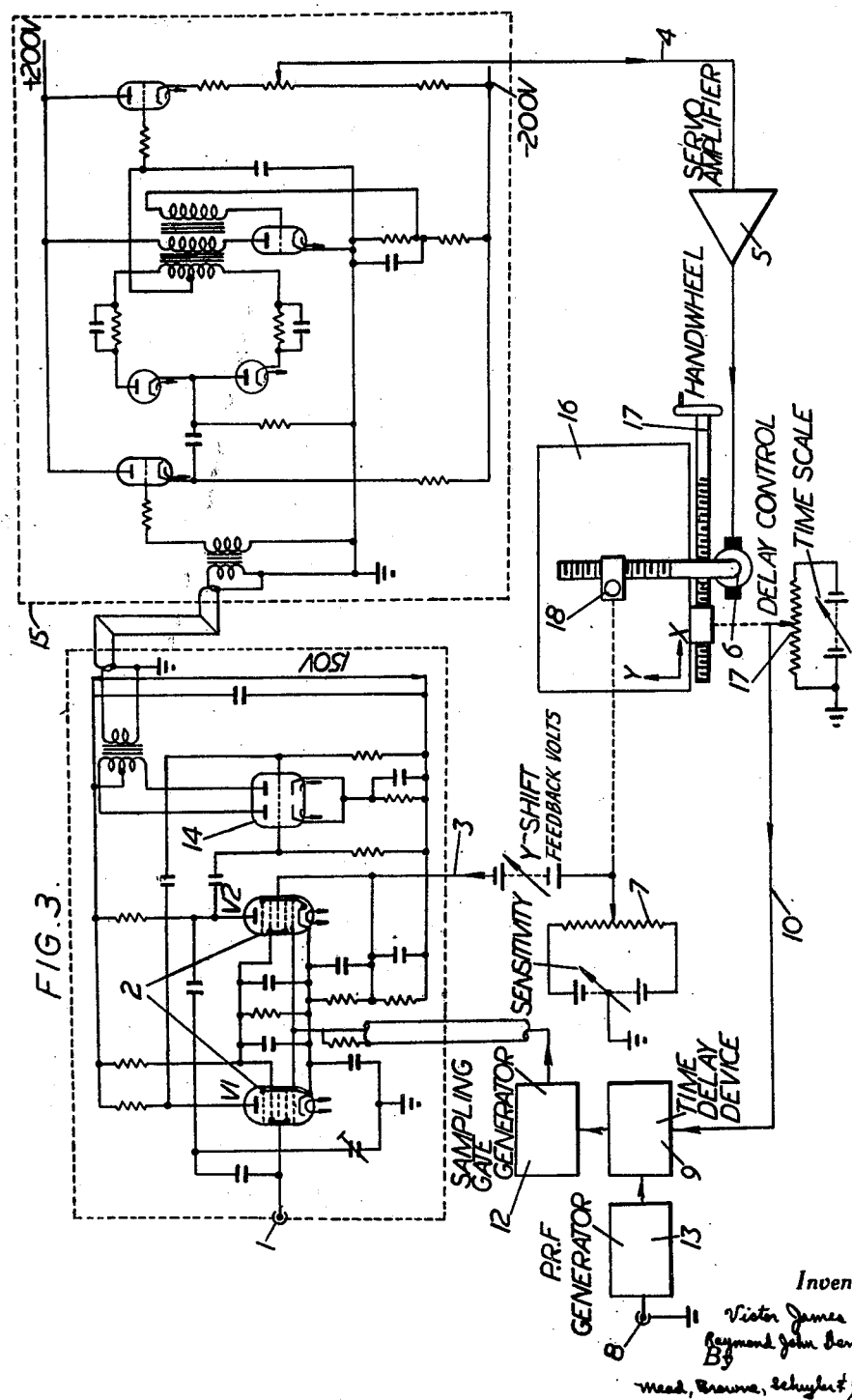
Figure 3 is a similar view to Figure 1 but shows more detail.
Figure 4:
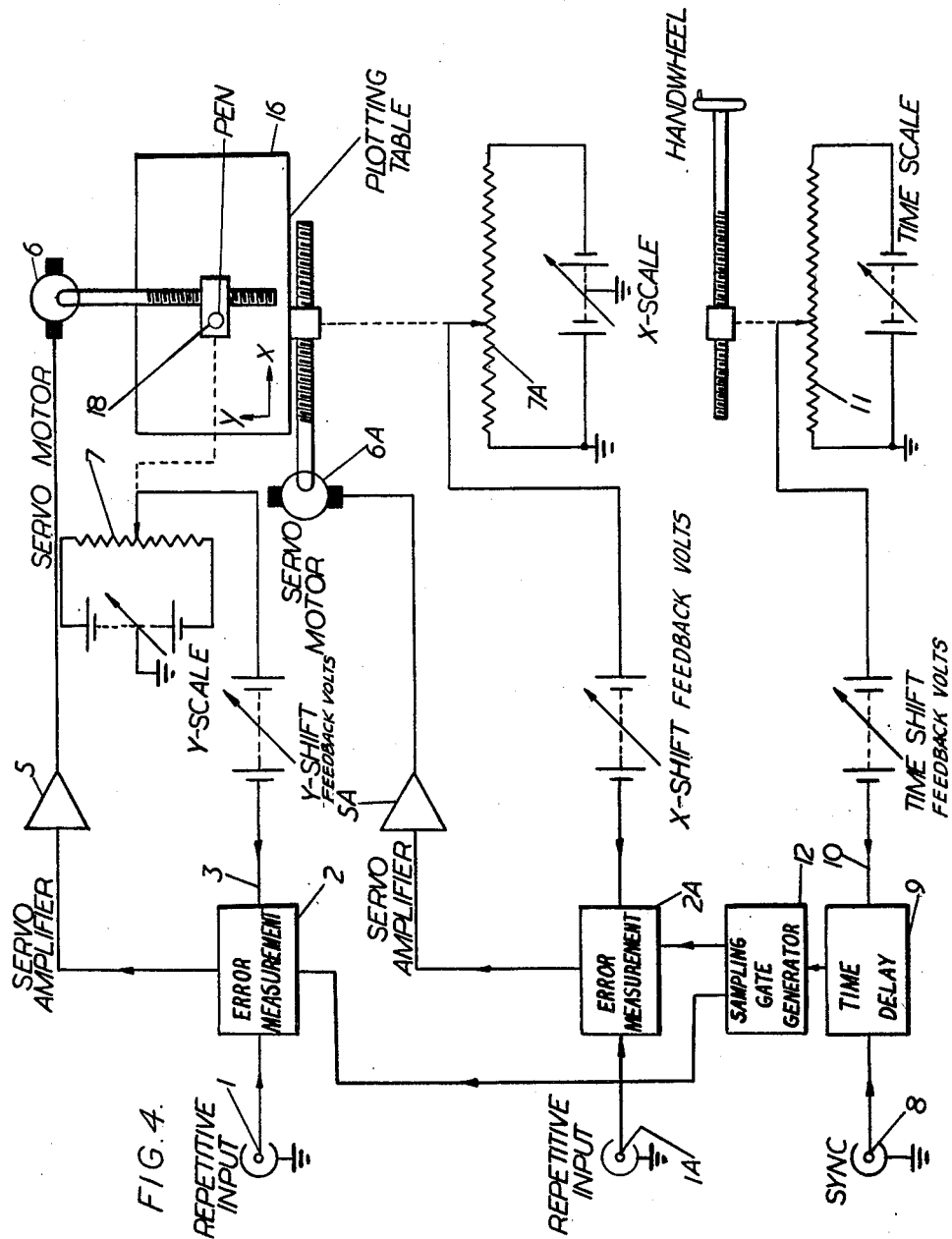
Figure 4 is a schematic circuit diagram of a modification.

In Figure 3, like parts to those of Figure 1 are indicated by the same reference numeral.

In Figure 3, the synchronizing pulse derived from any wave synchronous with the waveform under observation operates a pulsed repetition frequency generator 13 which is arranged to feed a main delay device 9. The gate pulse generator 12 is arranged to gate the valves $V_1$ and $V_2$ in the voltage difference indicator 2. The arrangement is such that the valves are cut off at all times except for the duration of the sampling gate pulse from 12.

In the interests of balance, it is preferable to use the two valve arrangement, the third grid of one being connected to a reference voltage 3 while the third grid of the other valve is the input electrode for the wave from terminal 1. In the output of valves $V_2$ and $V_2$ is a pulse amplifier and differencing device 14, and a device 15 whereby the difference in pulse currents of the two valves is stretched and applied as a D.C. error signal to the servo motor 6. The motor shaft is shown mechanically coupled to the slider of potentiometer 7 while a recording sheet carrier 16 is mechanically coupled with the slider of potentiometer 11. The carrier is shown to be operable by a hand wheel 17.

A synchronizing pulse from terminal 8 may actuate a time delay 9 to produce a time delay, the duration of which is governed by and linearly related to a control voltage on lead 10. This time delay device 9, which is shown schematically in Figs. 1 and 3, may be of a type which is already known in the art. Thus, the circuitry and operation of time delay device 9 may be substantially the same as that of the device disclosed in "Principles of Radar"—M.I.T. Radar School Staff (Second Edition)— published by McGraw-Hill Book Company—chapter III, article 7—pages 3–27 and 3–28, with additional reference to pages 3–22 and pages 2–58 of said book. Many refinements and variants on this delay device are known, and, for purposes of the present invention, it is only necessary that the duration of delay to a pulse is governed by a variable control voltage.

Many refinements and variants on this delay circuit are known.

Above we have described how a repetitive waveform may be plotted as a graph which is a function of time. The invention may be used to compare two waveforms of the same repetitive frequency and produce a curve in which time is merely a parameter. Such an arrangement is illustrated in Figure 5. In this drawing, the reference numerals indicate like parts with those of Figure 1 but the slider of the potentiometer 11 is manually adjustable but is not coupled with the paper carrier and a second input terminal 1a introduces a second repetitive waveform synchronous with the waveform at terminal 1. This terminal 1a is connected to a voltage difference indicating device 2a similar to 2; a second servo amplifier and motor 5a and 6a, respectively, has a potentiometer 7a similar to 7. However, the slider of potentiometer 7a is mechanically coupled with the sheet carrier 16. Thus, in this arrangement, the graph produced is a function of the instantaneous voltages of the two impressed waveforms with time appearing only as a parameter.

What we claim is:

1. In a recording voltmeter an input terminal for a repetitive wave form, a source of reference voltage, a voltage difference indicating device connected between the terminal and the source of reference voltage, gating means synchronised with the repetitive wave form to gate into operative condition the indicating device, means operated by said indicating device, when gated, to produce an output voltage when the voltage of the wave form differs from the reference voltage, a potentiometer with a slider mechanically coupled to a recording stylus, means for causing said potentiometer to provide said reference voltage, means for causing the position of the slider to be dependent on said output, a time delay device, and means for developing a variable control voltage for controlling said time to introduce a slight asynchronism in the gating means.

2. In a recording voltmeter an input terminal for a repetitive wave form, a source of reference voltage, a voltage difference indicating device connected between the terminal of the source of reference voltage, triggering means synchronised with the repetitive wave form to trigger into operative condition the indicating device, means operated by said indicating device, when triggered, to produce an output voltage when the voltage of the wave form differs from the reference voltage, a potentiometer with a slider mechanically coupled to a recording stylus, means for causing said potentiometer to provide said reference voltage, means for causing the position of the slider to be dependent on said output, a time delay device and a second potentiometer with a slider mechanically connected to the recording sheet carriage, means for introducing the voltage changes on said second potentiometer slider to be impressed through said time delay device on said triggering means to effect a slight asynchronism between the triggering pulse and the repetitive wave form.

3. In a recording voltmeter, an input terminal for a wave form under observation, a source of reference voltage, a voltage difference indicating device connected to the input terminal and to the source of reference voltage giving an output proportional to the instantaneous voltage difference between the said wave and the reference voltage, a first potentiometer controlling the magnitude of the reference voltage, an electro-mechanical transducer operatively connected to the output circuit of the said voltage indicating device, the slider of the said first potentiometer being controlled in position by the transducer, a gate pulse generator synchronously operated to trigger the voltage difference indicating device and operable at a frequency which is any sub-multiple, including the first, of the frequency of the said wave form, and a means for introducing a slight asynchronism depending on a variable voltage derived from a second potentiometer, the slider of the first potentiometer being mechanically coupled to a recording stylus and the slider of the other potentiometer being manually operable.

4. In a recording voltmeter, an input terminal for a wave form under observation, a source of reference voltage, a voltage difference indicating device connected to the input terminal and to the source of reference voltage giving an output proportional to the instantaneous voltage difference between the said wave and the reference voltage, a first potentiometer controlling the magnitude of the reference voltage, an electro-mechanical transducer operatively connected to the output circuit of the said voltage indicating device, the slider of the said first potentiometer being controlled in position by the transducer, a gate pulse generator synchronously operated to trigger the voltage difference indicating device and operable at a frequency which is any sub-multiple, including the first, of the frequency of the said wave form, and a means for introducing a slight asynchronism depending on a variable voltage derived from a second potentiometer, the slider of the first potentiometer being mechanically coupled to a recording stylus and the slider of the other potentiometer being mechanically coupled to the recording sheet carriage.

5. In a recording voltmeter two potentiometers, the slider of the first potentiometer being mechanically coupled to a recording stylus, the slider of the second potentiometer being mechanically coupled to the recording sheet carriage, a first input terminal for a first repetitive wave form, a second input terminal for a second repetitive wave form of the same repetitive frequency, two triggered voltage difference indicating devices, one connected between the first input terminal and slider and the other connected between the second input terminal and slider, each indicating device feeding servo mechanism operating the respective sliders to annul the voltage difference in each respective indicating device, a gating pulse generator connected to each said indicating device and gating its operation, means for deriving a trigger pulse which is any sub-harmonic, including the first, of said frequency, a time delay circuit, means for impressing said trigger pulse through said time delay circuit on to said pulse generator and means for varying the degree of delay in said time delay circuit.

6. A recording voltmeter according to claim 5 in which the duration of the gating pulse is a fraction of a microsecond.

References Cited in the file of this patent

UNITED STATES PATENTS

| | | |
|---|---|---|
| 2,400,828 | Keinath | May 21, 1946 |
| 2,458,731 | Rath | Jan. 11, 1949 |
| 2,763,859 | Kuder | Sept. 18, 1956 |